United States Patent
Guo et al.

(10) Patent No.: US 9,981,284 B2
(45) Date of Patent: May 29, 2018

(54) METHOD OF FORMING A LAMINATE

(71) Applicants: Qiang Guo, Shanghai (CN); Guoliang Pan, Shanghai (CN); Lianxiang Wang, Shanghai (CN); Xiaoye Liu, Shanghai (CN)

(72) Inventors: Qiang Guo, Shanghai (CN); Guoliang Pan, Shanghai (CN); Lianxiang Wang, Shanghai (CN); Xiaoye Liu, Shanghai (CN)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days. days.

(21) Appl. No.: 13/728,262

(22) Filed: Dec. 27, 2012

(65) Prior Publication Data

US 2013/0183539 A1 Jul. 18, 2013

Related U.S. Application Data

(60) Provisional application No. 61/681,418, filed on Aug. 9, 2012.

(30) Foreign Application Priority Data

Dec. 28, 2011 (CN) .......................... 2011 1 0462003

(51) Int. Cl.
*B05D 1/06* (2006.01)
*B05D 3/00* (2006.01)
(Continued)

(52) U.S. Cl.
CPC ............... *B05D 1/06* (2013.01); *B05D 5/083* (2013.01); *F16C 33/206* (2013.01);
(Continued)

(58) Field of Classification Search
CPC ..... Y10T 428/12049; Y10T 428/12472; Y10T 428/12549
(Continued)

(56) References Cited

U.S. PATENT DOCUMENTS 3,692,558 A 9/1972 Werner, Jr. et al.
3,697,309 A 10/1972 Werner, Jr.
(Continued)

FOREIGN PATENT DOCUMENTS

CA 1322747 C 10/1993
CA 2152279 A1 7/1994
(Continued)

OTHER PUBLICATIONS

Halar ECTFE Electrostatic Powder Coating Processing Manual, downloaded on Oct. 28, 2017 from http://eflon.co.il/userfiles/file/Halar-processing-manual.pdf (pp. 1-24), 2009 (no month). (Year: 2009).*

(Continued)

*Primary Examiner* — Michael E. La Villa
(74) *Attorney, Agent, or Firm* — Abel Law Group, LLP; Chi Suk Kim

(57) ABSTRACT

A bearing article can include a metal substrate having a bronze layer; a PEEK layer; a PTFE composition layer overlying and penetrating the PEEK layer. A method for preparing a bearing article can include providing a metal substrate with a sintered bronze layer, electrostatic spraying a non-fluorinated polymer onto the metal substrate followed by spraying a fluorinated polymer onto the non-fluorinated polymer and heat rolling to form a laminate.

17 Claims, 2 Drawing Sheets

(51) Int. Cl.
*C23C 4/00* (2016.01)
*F16C 33/00* (2006.01)
*B05D 5/08* (2006.01)
*F16C 33/20* (2006.01)
*B05D 7/00* (2006.01)
*B05D 3/02* (2006.01)

(52) U.S. Cl.
CPC .......... *F16C 33/208* (2013.01); *B05D 3/0218* (2013.01); *B05D 7/54* (2013.01); *B05D 2202/00* (2013.01); *B05D 2350/65* (2013.01); *B05D 2451/00* (2013.01); *F16C 2202/10* (2013.01); *F16C 2208/32* (2013.01); *F16C 2208/36* (2013.01); *F16C 2223/42* (2013.01); *F16C 2223/80* (2013.01); *F16C 2240/48* (2013.01); *F16C 2240/54* (2013.01); *F16C 2240/60* (2013.01); *Y10T 428/12049* (2015.01); *Y10T 428/12472* (2015.01); *Y10T 428/12549* (2015.01)

(58) Field of Classification Search
USPC ........................................................ 428/626
See application file for complete search history.

(56) References Cited

U.S. PATENT DOCUMENTS

| | | | |
|---|---|---|---|
| 3,911,161 A * | 10/1975 | Nord et al. | 427/483 |
| 4,011,361 A | 3/1977 | Vassiliou et al. | |
| 4,016,125 A | 4/1977 | Vassiliou et al. | |
| 4,039,713 A | 8/1977 | Vassiliou | |
| 4,049,863 A | 9/1977 | Vassiliou | |
| 4,070,525 A | 1/1978 | Vassiliou et al. | |
| 4,319,942 A | 3/1982 | Brenner | |
| 4,413,019 A | 11/1983 | Brenner | |
| 4,483,951 A | 11/1984 | Brenner | |
| 4,548,989 A | 10/1985 | Allen et al. | |
| 4,592,782 A | 6/1986 | Davies | |
| 4,595,718 A | 6/1986 | Allen et al. | |
| 4,605,695 A * | 8/1986 | Sakamaki | C08K 3/04 428/327 |
| 4,624,887 A | 11/1986 | Bickle et al. | |
| 4,655,944 A | 4/1987 | Mori | |
| 4,812,367 A | 3/1989 | Bickle | |
| 4,868,234 A | 9/1989 | Tabb et al. | |
| 4,925,892 A | 5/1990 | Tabb et al. | |
| 5,039,575 A | 8/1991 | Mori et al. | |
| 5,230,961 A | 7/1993 | Tannenbaum | |
| 5,239,026 A | 8/1993 | Babirad et al. | |
| 5,364,682 A | 11/1994 | Tanaka et al. | |
| 5,536,583 A * | 7/1996 | Roberts | C08K 3/0033 428/457 |
| 5,573,846 A | 11/1996 | Harig et al. | |
| 5,686,176 A | 11/1997 | Adam et al. | |
| 5,863,657 A | 1/1999 | Kawashima et al. | |
| 5,882,466 A | 3/1999 | Grootaert et al. | |
| 6,001,205 A | 12/1999 | Mauro | |
| 6,085,797 A | 7/2000 | Grabaum et al. | |
| 6,140,410 A | 10/2000 | Kolouch | |
| 6,183,137 B1 | 2/2001 | Kojima et al. | |
| 6,183,869 B1 | 2/2001 | Okuda et al. | |
| 6,258,413 B1 | 7/2001 | Woelki et al. | |
| 6,312,814 B1 | 11/2001 | Kolouch | |
| 6,316,534 B1 | 11/2001 | Shimokusuzono et al. | |
| 6,372,284 B1 | 4/2002 | Hess et al. | |
| 6,376,061 B1 | 4/2002 | Adam | |
| 6,413,588 B1 | 7/2002 | Pettus et al. | |
| 6,425,977 B2 | 7/2002 | McDonald et al. | |
| 6,528,143 B1 | 3/2003 | Adam et al. | |
| 6,531,950 B1 | 3/2003 | Becker et al. | |
| 6,565,257 B1 | 5/2003 | Kennedy et al. | |
| 6,569,816 B2 | 5/2003 | Oohira et al. | |
| 6,726,994 B1 | 4/2004 | Araki et al. | |
| 6,759,129 B2 | 7/2004 | Fukushi | |
| 6,770,378 B1 | 8/2004 | Lehmann | |
| 7,022,402 B2 | 4/2006 | Lacourt | |
| 7,025,853 B2 | 4/2006 | Kesselmayer | |
| 7,241,817 B2 | 7/2007 | Bonnet et al. | |
| 7,491,446 B2 | 2/2009 | Ueda et al. | |
| 7,581,734 B1 | 9/2009 | McLeod | |
| 7,829,618 B2 | 11/2010 | Longo et al. | |
| 7,887,922 B2 | 2/2011 | Mayston et al. | |
| 7,910,527 B2 | 3/2011 | Sawyer et al. | |
| 7,942,581 B2 | 5/2011 | Leonardelli | |
| 8,349,773 B2 | 1/2013 | Takayanagi et al. | |
| 8,646,977 B2 | 2/2014 | Adam | |
| 8,802,602 B2 | 8/2014 | Schmitjes et al. | |
| 2002/0117280 A1 | 8/2002 | Howle et al. | |
| 2003/0024380 A1 | 2/2003 | Shimo et al. | |
| 2003/0044553 A1 | 3/2003 | Ramanathan et al. | |
| 2003/0049485 A1 | 3/2003 | Brupbacher et al. | |
| 2003/0079847 A1 | 5/2003 | Howle et al. | |
| 2003/0104223 A1 | 6/2003 | Ferm et al. | |
| 2003/0158338 A1 | 8/2003 | Jazenski et al. | |
| 2003/0207118 A1 | 11/2003 | Fukushi | |
| 2004/0006867 A1 | 1/2004 | Becker et al. | |
| 2004/0071987 A1 | 4/2004 | Bate | |
| 2004/0096610 A1 | 5/2004 | Ramanathan et al. | |
| 2004/0115465 A1 | 6/2004 | Bickle et al. | |
| 2004/0115477 A1 | 6/2004 | Nesbitt | |
| 2004/0116792 A1 | 6/2004 | Nesbitt | |
| 2004/0167263 A1 | 8/2004 | Bate | |
| 2004/0228555 A1 | 11/2004 | Kim et al. | |
| 2005/0025977 A1 | 2/2005 | Adam et al. | |
| 2005/0048218 A1 | 3/2005 | Weidman | |
| 2005/0069778 A1 | 3/2005 | Bonnet et al. | |
| 2005/0090602 A1 | 4/2005 | Koshikawa | |
| 2005/0228441 A1 | 10/2005 | Wood et al. | |
| 2005/0233152 A1 | 10/2005 | Bate | |
| 2005/0266170 A1 | 12/2005 | Nesbitt | |
| 2006/0029795 A1 | 2/2006 | Sawyer et al. | |
| 2006/0110601 A1 | 5/2006 | Hennessey | |
| 2006/0229424 A1 | 10/2006 | Griswold et al. | |
| 2006/0247360 A1 | 11/2006 | Halasa et al. | |
| 2006/0247369 A1 | 11/2006 | Griswold et al. | |
| 2006/0247370 A1 | 11/2006 | Frye et al. | |
| 2007/0021544 A1 | 1/2007 | Yanase et al. | |
| 2007/0031275 A1 | 2/2007 | Nogawa et al. | |
| 2007/0092173 A1 | 4/2007 | Tsuji et al. | |
| 2007/0106294 A1 | 5/2007 | Nesbitt | |
| 2007/0110937 A1 | 5/2007 | Lokere et al. | |
| 2007/0123853 A1 | 5/2007 | Nesbitt | |
| 2007/0173590 A1 | 7/2007 | Longo et al. | |
| 2007/0177833 A1 | 8/2007 | Egami et al. | |
| 2007/0225177 A1 | 9/2007 | Murase et al. | |
| 2007/0232502 A1 | 10/2007 | Tsutsui et al. | |
| 2007/0269151 A1 | 11/2007 | Nardi et al. | |
| 2007/0281872 A1 | 12/2007 | Schubert et al. | |
| 2007/0298217 A1 | 12/2007 | Chen et al. | |
| 2008/0032060 A1 | 2/2008 | Nesbitt | |
| 2008/0050509 A1 | 2/2008 | Nesbitt | |
| 2008/0057251 A1 | 3/2008 | Griswold et al. | |
| 2008/0102307 A1 | 5/2008 | Zidar | |
| 2008/0113206 A1 | 5/2008 | Hoy et al. | |
| 2008/0159671 A1 | 7/2008 | Leonardelli | |
| 2008/0226933 A1 | 9/2008 | Bickle et al. | |
| 2009/0092827 A1 | 4/2009 | Robinson | |
| 2009/0304957 A1 | 12/2009 | Jamil et al. | |
| 2010/0028684 A1 | 2/2010 | Mariscal et al. | |
| 2010/0047467 A1 | 2/2010 | Nesbitt | |
| 2010/0092119 A1 | 4/2010 | Angenheister | |
| 2010/0098360 A1 | 4/2010 | Schmitjes et al. | |
| 2010/0119188 A1 | 5/2010 | Hsueh et al. | |
| 2010/0197849 A1 | 8/2010 | Momose et al. | |
| 2010/0215834 A1 | 8/2010 | Nesbitt | |
| 2010/0239883 A1 | 9/2010 | Okladek et al. | |
| 2010/0290726 A1 | 11/2010 | Schlipf et al. | |
| 2010/0301525 A1 | 12/2010 | Price et al. | |
| 2010/0304063 A1 | 12/2010 | McCrea et al. | |
| 2011/0023726 A1 | 2/2011 | Nesbitt | |
| 2011/0049834 A1 | 3/2011 | Natu | |
| 2011/0159229 A1 * | 6/2011 | Doehle et al. | 428/81 |
| 2011/0262064 A1 | 10/2011 | Burgeff et al. | |

(56) References Cited

U.S. PATENT DOCUMENTS

| | | |
|---|---|---|
| 2011/0268944 A1 | 11/2011 | Adam et al. |
| 2011/0305874 A1 | 12/2011 | Thoumazet et al. |
| 2012/0008887 A1 | 1/2012 | Adam |
| 2012/0275731 A1 | 11/2012 | Ziegler et al. |
| 2013/0183488 A1 | 7/2013 | Liao et al. |
| 2013/0183539 A1 | 7/2013 | Guo et al. |
| 2013/0195388 A1 | 8/2013 | Ishii et al. |
| 2014/0010484 A1 | 1/2014 | Schmitjes |
| 2014/0024563 A1 | 1/2014 | Heidecker et al. |
| 2014/0329728 A1 | 11/2014 | Peng et al. |

FOREIGN PATENT DOCUMENTS

| | | |
|---|---|---|
| CA | 2684543 A1 | 10/2008 |
| CN | 1037481 A | 11/1989 |
| CN | 1261386 A | 7/2000 |
| CN | 1401898 A | 3/2003 |
| CN | 1659028 A | 8/2005 |
| CN | 1705830 A | 12/2005 |
| CN | 1756911 A | 4/2006 |
| CN | 1823132 A | 8/2006 |
| CN | 101061191 A | 10/2007 |
| CN | 101126417 A | 2/2008 |
| CN | 101413543 A | 4/2009 |
| CN | 101715392 A | 5/2010 |
| CN | 102271906 A | 12/2011 |
| DE | 1932343 A1 | 1/1971 |
| DE | 1961833 A1 | 6/1971 |
| DE | 3021369 A1 | 12/1981 |
| DE | 3343697 A1 | 6/1984 |
| DE | 3401804 A1 | 7/1985 |
| DE | 3534242 A1 | 3/1987 |
| DE | 3601569 A1 | 7/1987 |
| DE | 39 12 716 A1 | 10/1990 |
| DE | 19823609 A1 | 12/1999 |
| DE | 102005046571 A1 | 4/2007 |
| DE | 10 2008 055 194 A1 | 7/2010 |
| EP | 0119815 A2 | 9/1984 |
| EP | 217462 A1 | 4/1987 |
| EP | 0008542 B2 | 11/1988 |
| EP | 0223268 B1 | 3/1989 |
| EP | 0232922 B1 | 6/1989 |
| EP | 0394518 A1 | 10/1990 |
| EP | 0650987 A1 | 5/1995 |
| EP | 0848031 A1 | 6/1998 |
| EP | 0988898 A2 | 3/2000 |
| EP | 1077230 A1 | 2/2001 |
| EP | 1724104 A4 | 7/2007 |
| EP | 2139675 A1 | 1/2010 |
| EP | 1892429 B1 | 3/2012 |
| EP | 2702285 A2 | 3/2014 |
| FR | 1354161 A | 3/1964 |
| GB | 1265140 A | 3/1972 |
| GB | 1338234 A | 11/1973 |
| GB | 1 472 079 | * 4/1977 |
| GB | 2123430 A | 2/1984 |
| JP | 61-211525 A | 6/1986 |
| JP | 07-018035 A | 1/1995 |
| JP | 1-173446 A | 7/1995 |
| JP | 9-117095 A | 5/1997 |
| JP | 10-331855 A | 12/1998 |
| JP | 2000117888 A | 4/2000 |
| JP | 2000153575 A | 6/2000 |
| JP | 2000-192961 A | 7/2000 |
| JP | 2001511502 A | 8/2001 |
| JP | 2002-194380 A | 7/2002 |
| JP | 2004-019758 A | 1/2004 |
| JP | 2004-035890 A | 2/2004 |
| JP | 2004358904 A | 12/2004 |
| JP | 2005-015793 A | 1/2005 |
| JP | 2005035300 A | 2/2005 |
| JP | 04-505335 B2 | 4/2006 |
| JP | 2006-111885 A | 4/2006 |
| JP | 2007145894 A | 6/2007 |
| JP | 2008264305 A | 11/2008 |
| JP | 2010-525245 A | 7/2010 |
| KR | 20050106066 A | 11/2005 |
| KR | 20100012028 A | 2/2010 |
| KR | 20101237477 A | 2/2010 |
| MX | 2009011322 A | 12/2009 |
| RU | 2009139818 A | 5/2011 |
| RU | 2438877 C2 | 1/2012 |
| WO | 9415999 A1 | 7/1994 |
| WO | 9727003 A1 | 7/1997 |
| WO | 9844545 A1 | 10/1998 |
| WO | 9901675 A1 | 1/1999 |
| WO | 200029210 A1 | 5/2000 |
| WO | 2002096644 A1 | 12/2002 |
| WO | 2003/027522 A2 | 4/2003 |
| WO | 2004056751 A1 | 7/2004 |
| WO | 2004056754 A1 | 7/2004 |
| WO | 2008/094652 A2 | 8/2008 |
| WO | 2008096097 A1 | 8/2008 |
| WO | 2008-121682 A2 | 10/2008 |
| WO | 2008128579 A1 | 10/2008 |
| WO | 2009144495 A2 | 12/2009 |
| WO | 2010038137 A1 | 4/2010 |
| WO | 2010076307 A1 | 7/2010 |
| WO | 2010138172 A1 | 12/2010 |
| WO | 2012149447 A2 | 11/2012 |
| WO | 2013/101928 A1 | 7/2013 |
| WO | 2013101905 A1 | 7/2013 |
| WO | 2014001524 A1 | 1/2014 |

OTHER PUBLICATIONS

French Search Report from FR Application No. 1104125 dated Sep. 24, 2012, 3 pgs.

Briscoe, B. J., et al., "The friction and wear of Poly(tetrafluoroethylene)-Poly(etheretherketone) composites: an initial appraisal of the optimum composition," Wear, Elsevier Sequoia, Lausanne, CH, vol. 108, Jan. 1, 1986, pp. 357-374, XP002351273.

Zhang, Z. et al., "Wear of PEEK composites related to their mechanical performances," Tribology International Butterworth Scientific Ldt, Guildford, GB, vol. 37, Jan. 1, 2004, pp. 271-277, XP002351274.

U.S. Appl. No. 113/728,405, filed Dec. 27, 2012, Inventors: Hanlin Liao et al., 28 pgs.

International Search Report from PCT Application No. PCT/US2012/071775 dated Apr. 24, 2013, 1 pg.

International Search Report from PCT Application No. PCT/US2012/071814 dated Apr. 12, 2013, 1 pg.

French Search Report from FR Application No. 1457516 dated Jan. 13, 2015, 6 pgs.

Supplementary European Search Report for EP12862673 dated Dec. 8, 2015, 2 pages.

International Search Report from PCT/EP2013/063672 dated Sep. 25, 2013, 1 pg.

Search Report for FR1457516 dated Jan. 13, 2015, 6 pages.

International Search Report for PCT/EP2007/060736 dated Feb. 1, 2008, 1 page.

U.S. Appl. No. 12/582,335, 16 pages.

International Search Report for PCT/US2012/035621 dated Nov. 29, 2012, 1 page.

U.S. Appl. No. 13/458,882, 28 pages.

International Search Report for PCT/EP2013/070239 dated Jan. 8, 2014, 2 pages.

* cited by examiner

METHOD OF FORMING A LAMINATE

CROSS-REFERENCE TO RELATED APPLICATION(S)

The following disclosure is a non-provisional application which claims priority to Chinese Application No. 201110462003.3 filed Dec. 28, 2011, entitled "A MULTI-LAYER COMPOSITE INCLUDING A FLUOROPOLYMER SURFACE AND A NON-FLUORINATED POLYMER TRANSITION LAYER" and having named inventors Qiang Guo, Guoliang Pan, Lianxiang Wang and Xiaoye Liu, and further claims priority to U.S. Provisional Application No. 61/681,418, filed Aug. 9, 2012, entitled "A MULTI-LAYER COMPOSITE INCLUDING A FLUOROPOLYMER SURFACE AND A NON-FLUORINATED POLYMER TRANSITION LAYER" and having named inventors Qiang Guo, Guoliang Pan, Lianxiang Wang and Xiaoye Liu, the applications of which are incorporated by reference herein in their entirety.

FIELD OF THE DISCLOSURE

The disclosure relates to a laminates comprising a metal support, a transition layer comprising a non-fluorinated thermoplastic applied directly thereto and a fluorinated polymer, which can serve as a sliding layer applied to the transition layer.

BACKGROUND

Laminates which comprise a layer structure having a metallic support material, an intermediate layer and a sliding layer applied thereto have been known for a long time in a variety of forms from the prior art and are used in a wide variety of technical fields, for example in the field of automotive engineering.

For slide bearings, especially conventional DU® bearing material, a sliding layer composed of a PTFE compound material is in turn applied to the intermediate layer. In this slide bearing material, the intermediate layer, which has the function of establishing firm adhesion of the sliding layer to the support material, is just a bronze layer sintered from bronze particles. However, this process is problematic for a variety of reasons, including performance limitations of the laminate product and failure in ensuring the combination between PTFE and the support material. As such, there is a continued need for improved laminates for applications such as slide bearings.

Therefore, it would be advantageous if a laminate could be produced that has strong adhesion to the metal support and the sliding layer.

SUMMARY

In one aspect, a bearing article can include a metal substrate. The metal substrate can include a bronze layer. The bearing article can further include a polyether-ether-ketone (PEEK) layer. A polytetrafluoroethylene (PTFE) composition layer can overlie and penetrate the PEEK layer.

In another aspect, a method of forming a laminate includes providing a metal substrate. The method can include preheating the metal substrate. The method can include electrostatic spraying the metal substrate with a thermoplastic powder to form a transition layer. The thermoplastic powder can include a non-fluorinated thermoplastic powder. The method can include spraying the transition layer with a second thermoplastic powder. The second thermoplastic powder can include a fluorinated thermoplastic powder.

In yet one further aspect, a method of forming a bearing article can include providing a metal substrate. The method can include sintering the metal substrate with a bronze layer. The method can further include preheating the metal substrate. The method can include electrostatic spraying the metal substrate with a polyether-ether-ketone to form a transition layer. The method can include spraying the transition layer with a thermoplastic powder. The thermoplastic powder can include a fluorinated thermoplastic powder.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
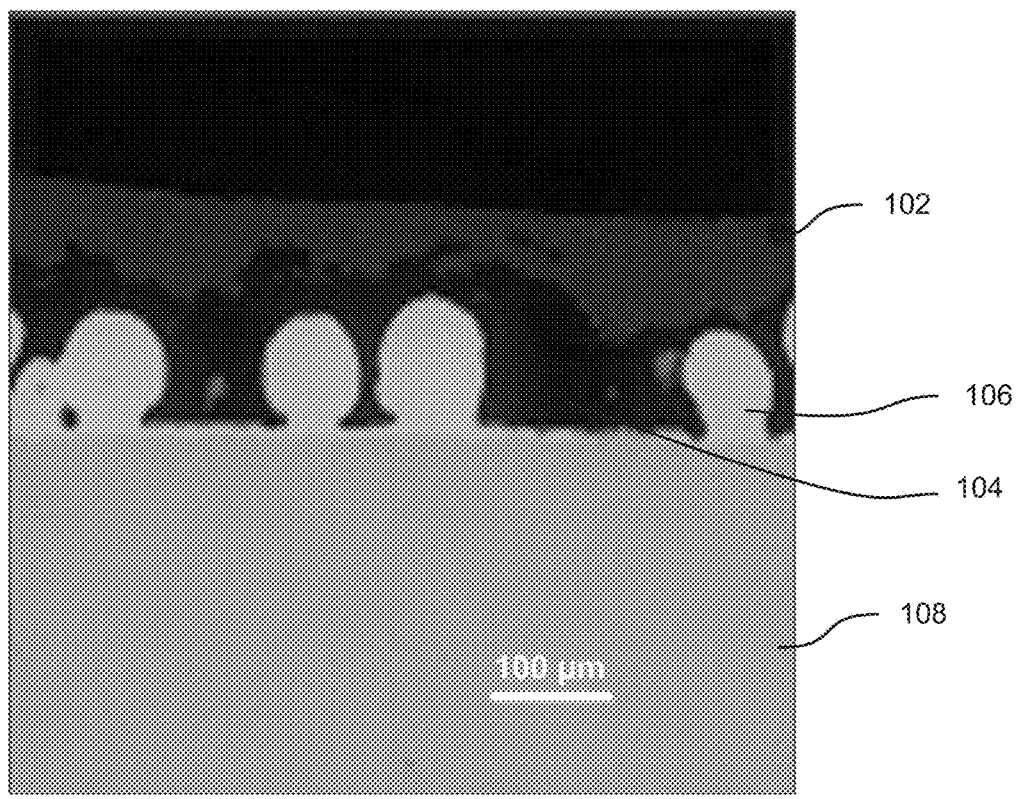
FIG. 1 shows an exemplary slide bearing in sectional view.

In an embodiment, a bearing article can include a metal substrate, a bronze layer, and a polyether-ether-ketone (PEEK) layer. A polytetrafluoroethylene (PTFE) composition layer can overlie and penetrate the PEEK layer.

In one embodiment, the metal substrate including the bronze layer can have a surface roughness of at least about 1 micron, such as at least about 2 microns, or about 5 microns, at least about 10 microns, or even at least about 100 microns. The surface roughness of the metal substrate can be no greater than about 200 microns, such as no greater than about 150 microns, not greater than about 100 microns, or even no greater than about 80 microns.

In one embodiment, the bronze layer can be sintered with bronze particles.

In another embodiment, the bearing article includes a PEEK layer with a thickness of at least about 10 microns, such as at least about 20 microns, at least about 30 microns, at least about 50 microns, or at least about 70 microns. In another embodiment, the bearing article includes a PEEK layer with a thickness of not greater than about 500 microns, such as not greater than about 400 microns, not greater than about 300 microns, not greater than about 200 microns, not greater than 180 microns, or not greater than about 150 microns.

In another embodiment, the bearing article includes a PEEK layer, wherein the PEEK layer is porous. The porosity, which is the ratio of void volume over total volume of the PEEK layer, can be at least about 0.05, such as at least about 0.1, or at least about 0.2. The porosity can be no greater than about 0.8, such as no greater than about 0.7, or not greater than about 0.5.

In one embodiment, the bearing article includes a PTFE composition layer with a thickness of at least about 10 microns, such as at least about 20 microns, at least about 30 microns, at least about 50 microns, or at least about 70 microns. In another embodiment, the bearing article includes a PTFE composition layer with a thickness of not greater than about 500 microns, such as not greater than about 400 microns, not greater than about 300 microns, not greater than about 200 microns, not greater than 180 microns, or not greater than about 150 microns.

In one embodiment, the bearing article includes a PEEK in an amount of at least about 10 Vol %, such as at least about 20 vol %, at least about 40 vol %, or at least about 50 vol % of the combined polymer layers, i.e. the combination of the PEEK layer and the PTFE composition layer. In another embodiment, the bearing article includes a PEEK layer in an amount of not greater than about 80 vol %, such as not greater than about 70 vol %, not greater than about 60 vol %, or not greater than about 50 vol % of the combined layers, i.e. the combination of the PEEK layer and the PTFE composition layer.

In yet another embodiment, the bearing article has PTFE composition layer which further includes a filler. The filler can include fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or any combinations thereof.

In one embodiment, a method of forming a laminate can include providing a metal substrate; preheating the metal substrate; electrostatic spraying the metal substrate with a non-fluorinated thermoplastic powder to form a transition layer. The method can further include spraying the transition layer with a fluorinated thermoplastic powder to form a compound layer.

In another embodiment, the method can further include heat rolling the transition layer. In another embodiment, the method can include heat pressing the transition layer.

In one embodiment, the metal substrate includes a sintered layer. In another embodiment, the metal substrate includes a bronze layer. In one particular embodiment, the metal substrate includes a sintered bronze layer.

In one embodiment, preheating the metal substrate includes preheating at a temperature of at least about 25° C., such as at least about 30° C., at least about 40° C., or at least about 60° C. In another embodiment, preheating the metal substrate includes preheating at a temperature of not greater than about 125° C., such as not greater than about 100° C., not greater than about 90° C., or not greater than about 80° C. In a particular embodiment, preheating the metal substrate includes preheating at a temperature between 25° C. and 100° C.

In one embodiment, the method includes electrostatic spraying the metal substrate with a non-fluorinated thermoplastic powder to form the transition layer to a thickness of at least about 10 microns, such as at least about 20 microns, at least about 30 microns, at least about 50 microns, or at least about 70 microns.

The non-fluorinated powder can have an average particle size of at least about 1 micron, such as at least about 2 microns, at least about 5 microns, or even about 10 microns. In another embodiment, the non-fluorinated powder can have an average particle size of not greater than about 100 microns, such as not greater than about 80 microns, not greater than about 60 microns, or even not greater than about 40 microns.

In another embodiment, the method includes electrostatic spraying the metal substrate with a non-fluorinated thermoplastic powder to form the transition layer to a thickness of not greater than about 500 microns, such as not greater than about 400 microns, not greater than about 300 microns, not greater than about 200 microns, not greater than 180 microns, or not greater than about 150 microns.

In one embodiment, electrostatic spraying of the metal substrate with a non-fluorinated thermoplastic powder can include a thermoplastic powder selected from a poly-ether-ether-ketone (PEEK), an ultra-high-molecular-weight polyethylene (UHMWPE), a polyimide (PI), a polyamide (PA), a polyamideimide (PAI), or any combination thereof.

In one embodiment, spraying of the transition layer includes spraying the transition layer with a fluorinated thermoplastic powder. The fluorinated thermoplastic powder can include a polytetrafluoroethylene (PTFE), a perfluoroalkoxy polymer (PFA), fluorinated ehylene-propylene (FEP), polyvinylfluoride (PVF), polyvinylidene fluoride (PVDF), polychlorotrifluoroethylene (PCTFE), a polyethylenetetrafluoroethylene (ETFE), a polyethylenechlorotrifluoroethylene (ECTFE), or any combination thereof.

In one further embodiment, spraying of the transition layer includes electrostatic spraying the transition layer with a fluorinated thermoplastic powder.

In another embodiment, the method can further include heat rolling the compound layer. In another embodiment, the method can include heat pressing the compound layer.

In one embodiment, a method of forming a bearing article includes providing a metal substrate, sintering the metal substrate with a bronze layer, preheating the metal substrate, electrostatic spraying the metal substrate with a polyether-ether-ketone to form a transition layer. The method can further include spraying the transition layer with a fluorinated thermoplastic powder to form a compound layer.

In one embodiment, the method includes heat rolling the compound layer.

As discussed above regarding the method of forming a laminate, preheating the metal substrate in this method includes preheating at a temperature of at least about 25° C., such as at least about 30° C., at least about 40° C., or at least about 60° C. In another embodiment, preheating the metal substrate includes preheating at a temperature of not greater than about 125° C., such as not greater than about 100° C., not greater than about 90° C., or not greater than about 80° C. In a particular embodiment, preheating the metal substrate includes preheating at a temperature between 25° C. and 100° C.

In one embodiment, the transition layer has a thickness of thickness of at least about 10 microns, such as at least about 20 microns, at least about 30 microns, at least about 50 microns, or at least about 70 microns. In another embodiment, the transition layer has a thickness of not greater than about 500 microns, such as not greater than about 400 microns, not greater than about 300 microns, not greater than about 200 microns, not greater than 180 microns, or not greater than about 150 microns.

The fluorinated thermoplastic powder includes a polytetrafluoroethylene (PTFE), a perfluoroalkoxy polymer (PFA), fluorinated ethylene-propylene (FEP), polyvinylfluoride (PVF), polyvinylidene fluoride (PVDF), polychlorotrifluoroethylene (PCTFE), a polyethylenetetrafluoroethylene (ETFE), a polyethylenechlorotrifluoroethylene (ECTFE), or any combination thereof.

In one embodiment, the transition layer and the compound layer have a combined thickness of at least about 20 microns, such as at least about 40 microns, at least about 80 microns, or at least about 100 microns. In another embodiment, the combined thickness is not greater than about 1 millimeter, such as not greater than about 500 microns, or at not greater than about 300 microns.

EXAMPLES

High performance non-fluorinated polymers, such as PEEK have favorable properties such as chemical resistance, electric insulation, self-lubrication, or durability against stress. Fluorinated polymers such as PTFE have favorable properties such as chemical resistance, heat resistance, and low friction.

FIG. 1 shows an exemplary laminate in sectional view. Layer 102 depicts PTFE overlying and penetrating layer 104. Layer 104 consists of PEEK, surrounding and overlying elements 106 and backing 108. Elements 106 are bronze particles sintered onto metal backing 108.

Figure 2:
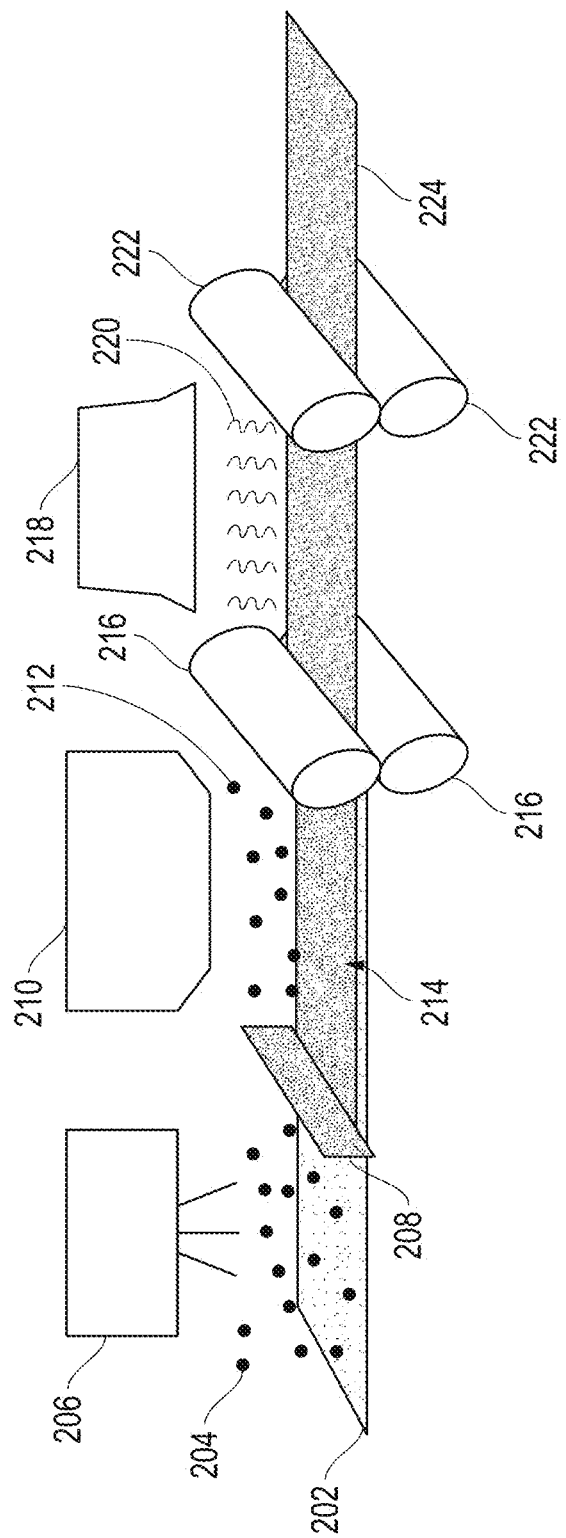
FIG. 2 shows a process for forming a laminate.

FIG. 2 shows an exemplary process for forming a laminate. A metal substrate 202 including a roughened surface through bronze particles sintered onto the surface of the metal surface is sprayed with PEEK powder 204. The spraying is conducted through device 206 capable of electrostatic spraying. Electrostatic spraying creates a porous PEEK layer 214. The porous PEEK layer 214 can be applied to any desired thickness. The amount of PEEK applied can be made dependent from properties such as desired adhesion strength to the metal backing or other properties, e.g., electrical insulation, which may require a thicker layer. After the spraying of the PEEK layer, the PEEK layer is smoothened by skimming board 208. Next, PTFE compound powder 212 from applicator 210 is applied onto the porous PEEK layer 214. The PTFE compound can include a single PTFE polymer or a mixture of PTFE with another polymer, filler, surface agent, softening agent, plasticizer, or any other beneficial agent.

The PTFE compound layer can be applied to any desired thickness depending from its commercial purpose. The PTFE compound layer can be sprayed onto the porous PEEK layer. For example, the PTFE can also be electrosprayed. It is also contemplated that PEEK and PTFE can be sprayed subsequently as shown in FIG. 2, concurrent (not shown in FIG. 2) or partially concurrent (not shown in FIG. 2), i.e. there is a phase when PEEK is sprayed, a phase when PEEK and PTFE is applied, and a phase when PTFE is applied.

Upon application of the PTFE compound powder, the assembly undergoes pressure and/or heat treatment. As shown in FIG. 2, the assembly can be pressed through rolls 216. In another embodiment, rolls 216 can also be heated, thereby calendering the assembly. Heat 220 can be applied with heater 218. Optionally, after heat treatment, the assembly can be pressed or calendered by rolls 220 to form compound layer 224. In other embodiments and not shown in FIG. 2, the assembly can undergo cold rolling followed by polymer or plastic sintering.

Example 1

PEEK with an average particle size of about 20 microns was electrosprayed onto a bronze sintered steel substrate. After that a PTFE compound material was applied. The PTFE compound material includes PTFE powder, graphite, and molybdenum disulfide. The PTFE powder had an average particle size of 40 microns, the graphite had an particle size ranging from 1 micron to 7 microns. Molybdenum disulfide had an average particle size of about 3 microns.

The laminate was rolled to achieve a laminate thickness of 1 mm, then the laminate was sintered at 370° C. for 2 hrs followed by heating at 200° C. for Tribological testing was conducted according to China Standard GB3960-83 using Instrument Tribometer MA2000. The testing condition included a load of 200N, rotating speed: 200 rpm. Table 1 summarizes the result of laminates with and without a PEEK layer. The metal backing became visible on laminates without PEEK layer after 2 hrs of tribological testing while laminate with PEEK layer still have plastics on the surface.

TABLE 1

| Laminate | 1 h | | | 2 h | | |
|---|---|---|---|---|---|---|
| | Coefficient of Friction | Weight loss (mg) | Wear width (mm) | Coefficient of Friction | Weight loss (mg) | Wear width (mm) |
| w PEEK | 0.436 | 3.4 | 3.753 | 0.375 | 3.5 | 4.04 |
| w/o PEEK | 0.506 | 5.69 | 4.637 | 0.520 | 5.79 | 4.80 |

As shown in Table 1, the laminate containing an electrosprayed PEEK layer have lower coefficient of friction during the testing and a lower weight loss than samples that contain no PEEK layer. Furthermore, the wear width of samples with PEEK is less than without PEEK.

Laminates or slide bearings can be prepared in a vast number of very different shapes and sizes. The smallest bearing, also called a pico bearing, is only a few μm in height compared to bearings for other applications that could be up to 500 mm.

Slide Bearings made from the laminates discussed herein can include plane bearings, annular bearings, bushings, balljoint bearings (half spheres), plain bearings, axial bearings, thrust bearings, linear bearings, bearing shells, bearing cups and combinations thereof.

It is advantageous that the bearing is maintenance free. The term "maintenance-free" describes bearings that do not need to be greased as was the case for bearings in early car doors. Yet, the life time of maintenance-free bearings exceeds the average life time of the product these bearings are incorporated or the life time of conventional bearings applied for the same purpose.

Slide bearings are applied in a broad spectrum of commercial industry ranging from the heavy metal industry to the automotive and bike industry, laptop/mobile phone hinges, bearings for solar applications and more.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion.

For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of forming a laminate, the method comprising:
    providing a metal substrate to which a layer of bronze particles is sintered;
    electrostatic spraying the metal substrate with a non-fluorinated thermoplastic powder comprising a ultra-high-molecular-weight polyethylene (UHMWPE), a polyimide (PI), a polyamide (PA), a polyamideimide (PAI), or any combination thereof, and covering the bronze particles with the non-fluorinated thermoplastic powder to form a transition layer; and
    spraying the transition layer with a fluorinated thermoplastic powder to form a compound layer, wherein the transition layer comprises PEEK, and wherein the fluorinated thermoplastic powder comprises polyvinylfluoride (PVF), polychlorotrifluoroethylene (PCTFE), a polyethylenechlorotrifluoroethylene (ECTFE), or any combination thereof.

2. The method according claim 1, further comprising preheating the metal substrate to a temperature between 25 deg C. and 100 deg C. prior to the electrostatic spraying with the non-fluorinated thermoplastic powder.

3. The method according to claim 1, wherein the transition layer has a thickness of at least about 10 microns.

4. The method according to claim 1, wherein the fluorinated thermoplastic powder further comprises polytetrafluoroethylene (PTFE), a perfluoroalkoxy polymer (PFA), fluorinated ethylene-propylene (FEP), polyvinylidene fluoride (PVDF), a polyethylenetetrafluoroethylene (ETFE), or any combination thereof.

5. The method according to claim 1, further comprising calendering the compound layer, heating the compound layer, pressing the compound layer, or any combination thereof.

6. The method according to claim 1, further comprising calendering the compound layer.

7. The method according to claim 1, further comprising heating the compound layer.

8. The method according to claim 1, further comprising pressing the compound layer.

9. The method according to claim 1, further comprising heat rolling the compound layer.

10. The method according to claim 1, wherein the transition layer and the compound layer have a combined thickness of at least about 20 microns.

11. The method according to claim 1, wherein the transition layer and the compound layer have a combined thickness of no greater than 1 mm.

12. The method according to claim 1, wherein the bronze layer has a surface roughness of at least about 1 micron.

13. The method according to claim 1, wherein the transition layer has a thickness of not greater than 500 microns.

14. The method according to claim 1, wherein the non-fluorinated powder has an average particle size of at least 1 micron.

15. The method according to claim 1, wherein the non-fluorinated powder has an average particle size of not greater than 1400 microns.

16. The method according to claim 1, wherein the fluorinated thermoplastic powder comprises a filler.

17. The method according to claim 16, wherein the filler comprises fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters, mineral materials, wollastonite, barium sulfate, or any combinations thereof.

* * * * *

UNITED STATES PATENT AND TRADEMARK OFFICE
CERTIFICATE OF CORRECTION

PATENT NO. : 9,981,284 B2
APPLICATION NO. : 13/728262
DATED : May 29, 2018
INVENTOR(S) : Qiang Guo et al.

Page 1 of 1

It is certified that error appears in the above-identified patent and that said Letters Patent is hereby corrected as shown below:

On the Title Page

Page 3, under "FOREIGN PATENT DOCUMENTS", please delete "JP 1-173446" and insert therefor --JP 7-173446--.

In the Claims

Column 8, Claim 15, please delete "1400" and insert therefor --100--.

Signed and Sealed this
Second Day of October, 2018

Andrei Iancu
*Director of the United States Patent and Trademark Office*